(12) United States Patent
Lin (10) Patent No.: US 11,516,972 B2
(45) Date of Patent: Dec. 6, 2022

(54) FELT PLANTERS AND RELATED METHODS

(71) Applicant: Huimiao Lin, Houston, TX (US)

(72) Inventor: Huimiao Lin, Houston, TX (US)

( * ) Notice: Subject to any disclaimer, the term of this patent is extended or adjusted under 35 U.S.C. 154(b) by 124 days.

(21) Appl. No.: 17/033,412

(22) Filed: Sep. 25, 2020

(65) Prior Publication Data

US 2022/0095548 A1   Mar. 31, 2022

(51) Int. Cl.
*A01G 9/02*  (2018.01)
*B65D 5/20*  (2006.01)
*B65D 5/24*  (2006.01)
*B65D 85/57*  (2006.01)
*A01G 9/029*  (2018.01)
*B65D 85/52*  (2006.01)

(52) U.S. Cl.
CPC .......... *A01G 9/026* (2013.01); *A01G 9/0293* (2018.02); *B65D 5/2038* (2013.01); *B65D 5/24* (2013.01); *B65D 85/52* (2013.01)

(58) Field of Classification Search
CPC ............. B65D 85/546; B65D 2301/00; B65D 85/1036; B65D 1/225; B65D 5/241; B65D 85/52; B65D 5/2028; B65D 5/2052; B65D 5/2057; B65D 5/2085; B65D 5/30; B65D 5/20; A01G 9/026; A01G 9/02; A01G 9/021; Y10T 428/12361; Y10T 428/12368
See application file for complete search history.

(56) References Cited

U.S. PATENT DOCUMENTS

| | | | | | |
|---|---|---|---|---|---|
| 1,439,426 | A | * | 12/1922 | Lemke | A01G 9/026 47/74 |
| 1,994,553 | A | * | 3/1935 | Wolcott | B65D 85/52 47/74 |
| 2,006,811 | A | * | 7/1935 | Mersbach | A24F 19/0028 131/240.1 |
| 3,150,812 | A | * | 9/1964 | Sabol | B65D 5/0005 229/101 |
| 4,245,773 | A | * | 1/1981 | Stollberg | B65D 5/6644 206/815 |

FOREIGN PATENT DOCUMENTS

DE           4009463 A1  *  9/1991

* cited by examiner

*Primary Examiner* — Kristen C Hayes
(74) *Attorney, Agent, or Firm* — Norton Rose Fulbright US LLP (57) ABSTRACT

The present disclosure includes foldable forms that are foldable between a first planar state and a second non-planar state. The form can include at least two sectors, each comprising first and second sub-sectors that each comprise a set of cuts. The set of cuts can include first through fourth cuts, where a portion of the form between the first cut, second cut, third cut, a theoretical line connecting the second and third cuts, and the edge forms a flap. The form can be folded, with the flaps received through the fourth cuts to make a container. The container can be usable as a planter.

20 Claims, 6 Drawing Sheets

FELT PLANTERS AND RELATED METHODS

BACKGROUND

A. Field of the Invention

The present invention relates generally to container structures, and more specifically, to forms for making container structures, the forms foldable between a first planar state and a second non-planar state and suitable for use in a variety of applications, including as planters.

B. Description of Related Art

Container structures can be formed from a variety of materials, including fiberglass, metal, resin, plastic, wood, stone, concrete, and terracotta. The material used can affect a container structure's aesthetic, functional, and structural characteristics, such as its style, durability, weather resistance, maintenance requirements, versatility with respect to different uses, space efficiency when not in use, and weight.

Typical materials used to produce container structures can impose limitations on the container's appearance, size, weight, durability, and/or cost. For example, containers for plants must be sufficiently stiff to receive and support the growth of a plant, and are often desirably lightweight, durable, aesthetically pleasing, and inexpensive. The above-listed materials can yield adequate stiffness, but may have drawbacks related to these other characteristics. Materials like stone, concrete, and terracotta are heavy and brittle and thus prone to chipping and breaking, and wood is susceptible to decay. Resin and plastic fade over time, causing containers made therefrom to appear worn. Fiberglass and metal can be expensive, and fiberglass fibers can wear and fray, giving containers a ragged appearance. Additionally, containers made of these materials may not have a changeable form (e.g., cannot be disassembled, folded, compressed, or the like), and thus may unnecessarily occupy significant space when not in use (e.g., when transported or stored). Accordingly, there is a need in the art for container structures that can support a plant therein but can address these drawbacks.

SUMMARY

Some embodiments of the present foldable forms include a form foldable between a first planar state and a second non-planar state as a result of a pattern of cuts to the form in which the form can define a container. The forms disclosed herein can be used to produce containers that, compared to current containers, can be more aesthetically pleasing, inexpensive, durable, lightweight, and space efficient when not in use. Such advantageous aesthetic, functional, and structural characteristics can be achieved by using a form foldable between a first planar state and a second non-planar state in which the form can define a container. Because the foldable form can be planar when the container is not in use (e.g., during transport or storage), it can occupy less space than current containers that are not convertible to a planar form. Additionally, because the form can be made from a variety of durable and lightweight inexpensive nonwoven materials, it can be used to provide a container which is not prone to chipping, breaking, decay, wear, or fray like current containers made from other materials. Further, because the form is not limited to a particular pattern of cuts, it can be folded into many aesthetically-pleasing shapes and sizes. Finally, some forms can include a pattern of cuts positioned to facilitate folding of the form into containers, where at least some of the cuts can receive a flap of the form to maintain the form in the non-planar state without the need for adhesives or extra materials.

Some of the present foldable forms are capable of being folded between a first planar state and a second non-planar state and, optionally, are a continuous piece of foldable material. Some foldable forms comprise, when in the first planar state, a first face, a second face that is opposite the first face, and an edge.

Some foldable forms include at least two sectors. In some foldable forms, each sector comprises a first sub-sector and a second sub-sector, each sub-sector defining a set of cuts. The set of cuts, in some of such foldable forms, comprises a first cut, a second cut, a third cut, and a fourth cut. In some foldable forms, the first cut extends from the edge and toward a center of the form and terminates at the second cut that extends from the first cut and away from the center. A smallest angle defined between the first and second cuts of each set, in some foldable forms, is between 30 and 90°. The third cut, in some foldable forms, extends from a portion of the edge that is disposed between the first cut of the first sub-sector and the first cut of the second sub-sector. In some foldable forms, the second and third cuts of each set are collinear but do not intersect. In some foldable forms, the first and second cuts are disposed between the third cut and the fourth cut in a direction along the edge. The fourth cut, in some foldable forms, does not extend to the edge and does not contact the first, second, or third cuts. In some foldable forms, a smallest angle defined between the second and fourth cuts of each set is between 30 and 150°. In some foldable forms, the set of cuts of the second sub-sector mirrors the set of cuts of the first sub-sector with a line of symmetry running from the center to the edge and oriented between the third cut of the first sub-sector and the third cut of the second sub-sector.

In some foldable forms, for each sub-sector, a portion of the form between the first cut, second cut, third cut, a theoretical line connecting the second and third cuts, and the edge forms a flap of the sub-sector that is foldable relative to the rest of the form. In some of such foldable forms, the combined length of the second cut, the line connecting the second cut and third cut, and the third cut is at least 10% larger than the length of the fourth cut. The flaps that are foldable relative to the rest of the form, in some foldable forms, are capable of being inserted into the fourth cuts.

Some foldable forms are made of a material comprising a nonwoven material. The nonwoven material, in some foldable materials, has a grammage that is between 300 and 600 grams per square meter. In some foldable forms, the nonwoven material comprises polyethylene terephthalate, high-density polyethylene, low-density polyethylene, polypropylene, polystyrene, or a combination thereof. The foldable material, in some foldable forms, further comprises a liquid-impermeable material overlying the nonwoven material. The liquid-impermeable material, in some foldable forms, has a grammage that is between 100 to 300 grams per square meter. In some foldable forms, the liquid-impermeable material comprises polyethylene, polypropylene, polyester, or a combination thereof.

Some of the present containers are made from a foldable form folded into the second non-planar state. The foldable form can be any one of the present foldable forms. Some containers comprise a base and at least one side wall extending from the base to define a cavity, wherein optionally the container is self-supported. Some containers are capable of being used as a planter, wherein optionally soil, a seed, and/or a plant are disposed in the cavity.

In some containers, the at least one side wall includes at least four fourth cuts in total for the container. The at least one side wall, in some containers, includes, for each of the fourth cuts, a flap that has at least a second and a third cut. In some of such containers, for each of the second and third cuts, the cut is defined by two material edges on either side of the cut. In some containers, for each of the second and third cuts, one of the material edges extends along a portion of the edge of the flap and, optionally, the other of the material edges extends along an edge of the sidewall. The distance between the second and third cuts, in some containers, is at least 10% smaller than the length of the fourth cut. A portion of the side wall, in some containers, is received within each of the second and third cuts. In some containers, the height of the flap is at least 10% larger than the length of the fourth cut and, optionally, is substantially equal to the height of the sidewall. The flap, in some containers, is received by the fourth cut such that the flap is inside the cavity.

Some of the present methods of making a container from a foldable form comprise folding the form from the first planar state into the second non-planar state. The foldable form can be any of the present foldable forms. The container, in some methods, is usable as a planter.

Some methods comprise, for each sub-sector, folding the flap of the sub-sector and inserting the flap into the fourth cut and through the second face of the foldable form. Folding the flap, in some methods, comprises folding the flap in the direction of the first face along the line connecting the second and third cuts. Some methods further comprise, for each of the flaps, folding in the direction of the first face a portion of the flap bound by the first and second cuts and folding in the direction of the first face a portion of the flap bound by the third cut and a portion of the edge of the form to facilitate insertion of the flap into the fourth cut.

Some of the present methods of using a container as a planter comprise placing soil, one or more seeds, and/or one or more plants in the cavity of the container. The container can be any of the present containers.

The terms "a" and "an" are defined as one or more unless this disclosure explicitly requires otherwise. The phrase "and/or" means and or or. To illustrate, A, B, and/or C includes: A alone, B alone, C alone, a combination of A and B, a combination of A and C, a combination of B and C, or a combination of A, B, and C.

The term "substantially" and is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1%, 1%, 5%, and 10%.

The terms "comprising" (and any form thereof, such as "comprise" and "comprises"), "having" (and any form of having, such as "have" and "has"), "including" (and any form of including, such as "includes" and "include"), and "containing" (and any form of containing, such as "contains" and "contain") are open-ended linking verbs. As a result, a product that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
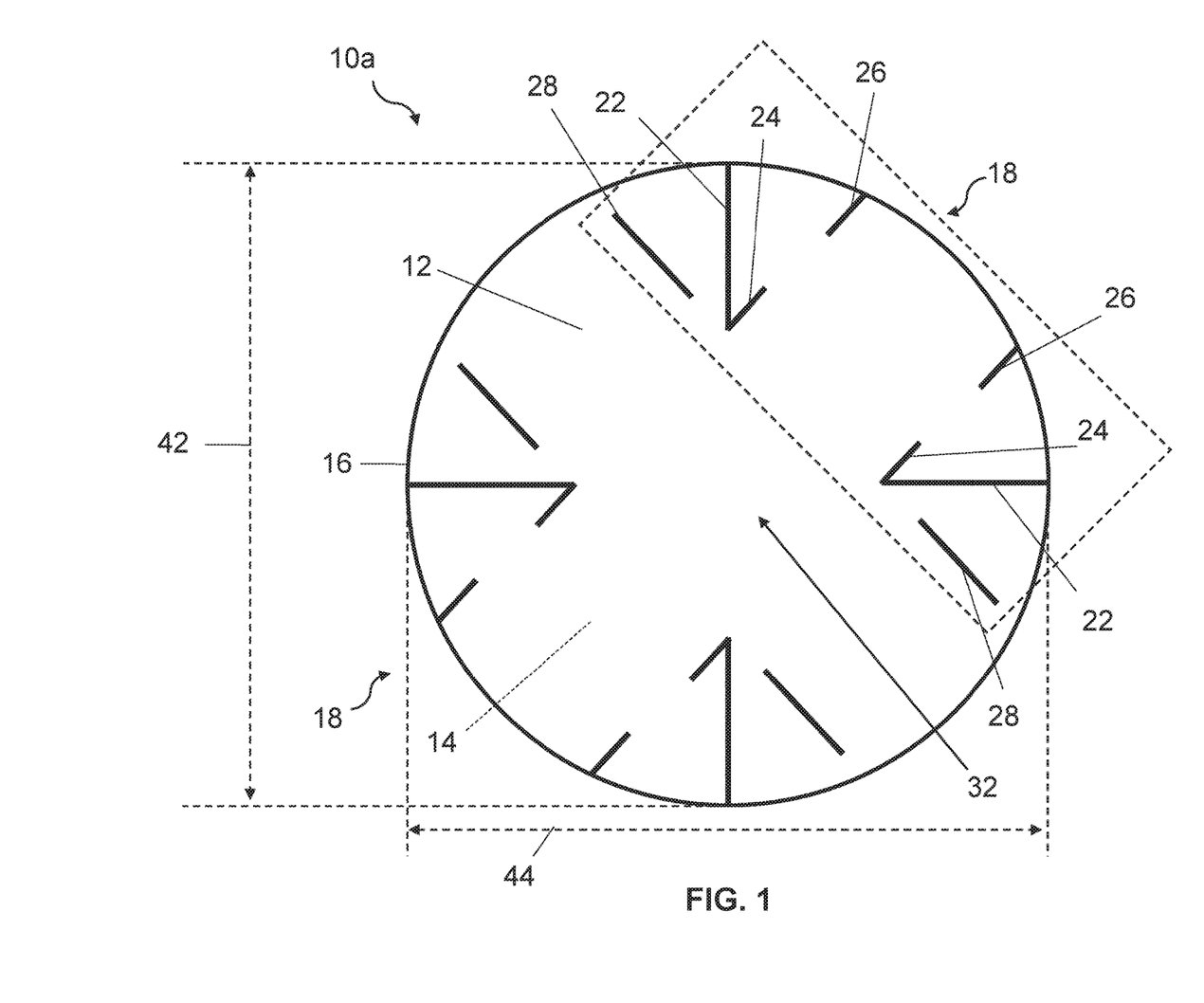
FIG. 1 is a top view of a first embodiment of the present foldable forms that includes two sectors, each having first and second sub-sectors that each comprise a set of cuts. The set of cuts includes first through fourth cuts to define, in each sub-sector, a flap that is insertable into the fourth cut of the sub-sector.

Referring to FIG. 1, shown is a first embodiment 10a of the present foldable forms that includes a first face 12, a second face 14 that is opposite the first face, and an edge 16. Foldable form 10a can be foldable between a first planar state and a second non-planar state in which the form can be made into a container such as a planter. To facilitate folding of the form 10a into a container, the foldable form can have two or more sectors 18, such as greater than or equal to any one of or between any two of two, three, four, five, six, seven, or eight sectors, that each includes cuts 22-28, such as greater than or equal to any one of, or between any two of, eight, nine, ten, eleven, twelve, thirteen, or fourteen cuts. As shown, foldable form 10a has two sectors 18, each having eight cuts 22-28.

Figure 2:
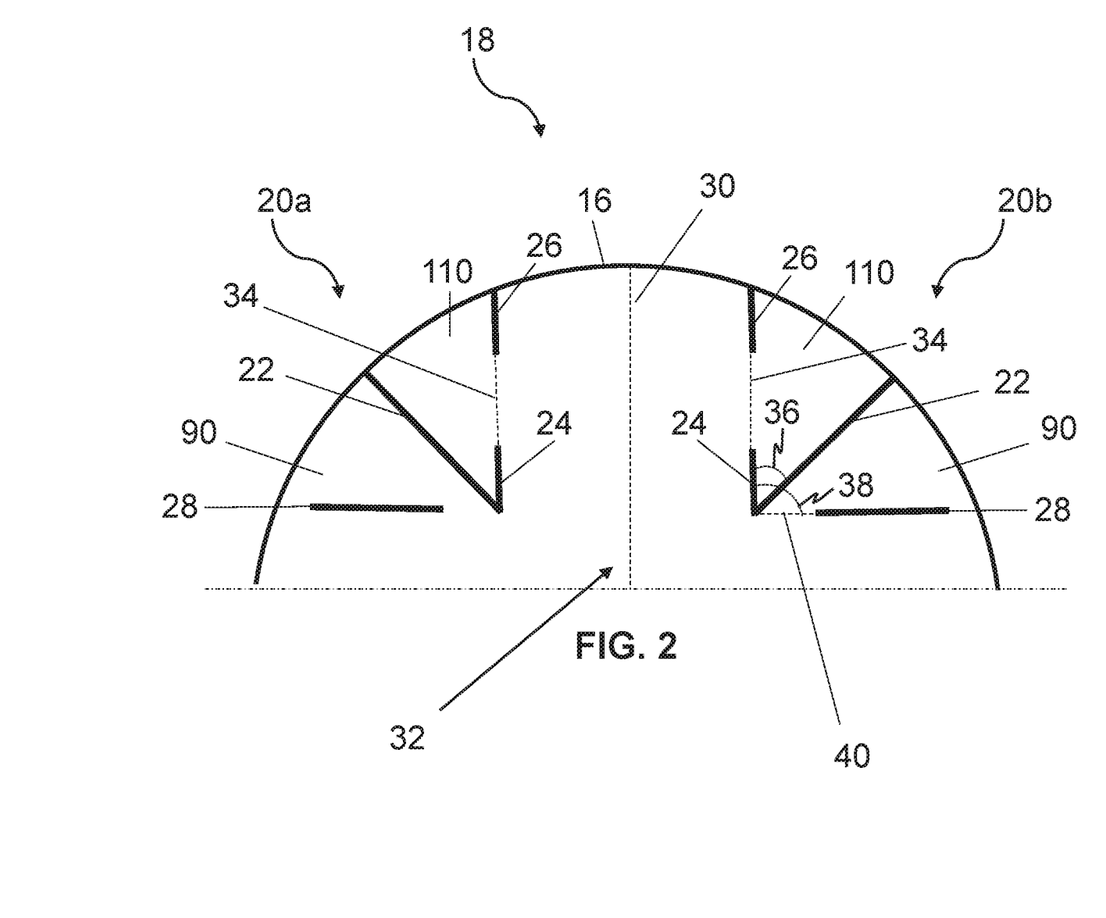
FIG. 2 depicts a sector of the foldable form of FIG. 1.

Referring additionally to FIG. 2, each sector 18 can include first and second sub-sectors 20a and 20b, each sub-sector defining a set of cuts that includes a first cut 22, a second cut 24, a third cut 26, and a fourth cut 28, which each can, but need not, be linear. As shown, the set of cuts of second sub-sector 20*b* can mirror the set of cuts of first sub-sector 20*a*, with a line of symmetry 30 running from foldable form 10*a*'s center 32 to its edge 16 and oriented between third cuts 26 of the first and second sub-sectors.

For each of sub-sectors 20*a* and 20*b*, first cut 22, second cut 24, and third cut 26 can be positioned to yield a flap 110 of the sub-sector that is foldable relative to the rest of the form. To illustrate, each first cut 22 can extend from edge 16 toward form 10*a*'s center 32 and terminate at second cut 24 without touching the center. Second cut 24 can extend from first cut 22 (and optionally terminates at the location where the first cut terminates at the second cut) and away from the center 32 in a direction angularly disposed relative to the first cut, and as shown does not extend to edge 16 and does not touch the center. For example, a smallest angle 36 between first and second cuts 22 and 24 can be greater than or substantially equal to any one of, or between any two of: 30, 35, 40, 45, 50, 55, 60, 65, 70, 75, 80, 85, or 90 degrees (e.g. approximately 45 degrees). Each third cut 26 can extend from a portion of edge 16 that is disposed between first cuts 22 of sub-sectors 20*a* and 20*b*. For example, as shown each third cut 26 extends from a portion of edge 16 that defines an arc between the two first cuts 22. For each sub-sector 20*a* and 20*b*, third cut 26 can, but need not, be substantially parallel and, optionally, in line with (e.g., collinear with) second cut 24 without touching the second cut or center 32. The portion of foldable form 10*a* between first, second, and third cuts 22, 24, and 26 and a theoretical line 34 connecting the second and third cuts can form flap 110 which is thereby foldable relative to the rest of the form (e.g., about the theoretical line).

For each set of cuts, fourth cut 28 can be positioned relative to first, second, and third cuts 22, 24, and 26 such that flap 110 is receivable therein when foldable form 10*a* is in the second non-planar state as described in further detail below. For example, as shown, in each sub-sector 20*a* and 20*b* first and second cuts 22 and 24 are disposed between third cut 26 and fourth cut 28 in a direction along edge 16. Fourth cut 28 can be positioned such that it does not touch first cut 22, second cut 24, or third cut 26 and/or does not extend to the edge 16 or center 32. In each sub-sector 20*a* and 20*b*, fourth cut 28 can be angularly disposed relative to second cut 24 such that a smallest angle 38 between the second and fourth cuts is greater than or substantially equal to any one of, or between any two of: 30, 40, 50, 60, 70, 80, 90, 100, 110, 120, 130, 140, or 150 degrees (e.g., approximately 90 degrees). Additionally, fourth cut 28 can be oriented so that it is collinear with a line 40 that extends between the fourth cut and the location at which first cut 22 terminates at second cut 24.

To facilitate retention of each flap 110 in a respective fourth cut 28, each flap can have a maximum dimension that is at least 2%, 4%, 6%, 8%, 10%, 12%, 14%, 16%, 18%, or 20% (e.g., at least 10%) larger than the length of the fourth cut. As shown, in each sub-sector 20*a* and 20*b* the maximum dimension of flap 110 can be the combined length of second cut 24, line 34 connecting the second cut and third cut 26, and the third cut. As a result, when flap 110 is received through fourth cut 28, at least a portion of the flap defining its maximum dimension can engage with other portions of form 10*a* to impede flap withdrawal through the fourth cut.

As described above, foldable form 10*a* can have at least two sectors 18; cuts 22-28 of a second one of the sectors can mirror those of a first one of the sectors, with a line of symmetry extending through center 32 and disposed substantially perpendicular to line of symmetry 30 about which the sets of cuts of first and second sub-sectors 20*a* and 20*b* are mirrored. In this manner foldable form 10*a* can have four flaps 110 and four fourth cuts 28, each configured to receive a respective one of the flaps.

Figure 3:
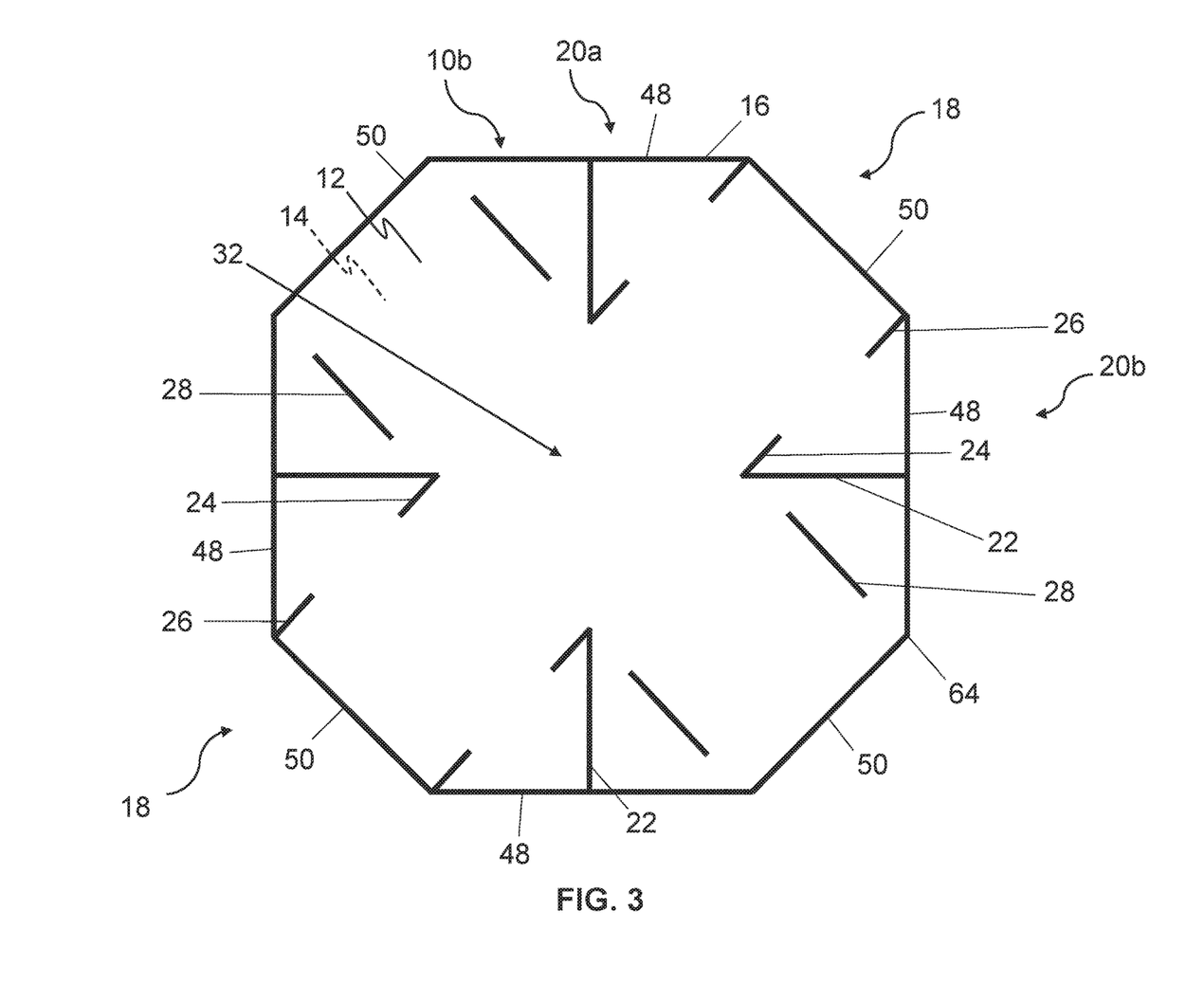
FIG. 3 is a top view of a second embodiment of the present foldable forms that is substantially the same as the FIG. 1 foldable form, except that it is octagonal rather than circular.

Foldable form 10*a* can be dimensioned and shaped such that, with its cuts 22-28, the foldable form can folded to define a container having a capacity suitable to hold, for example, soil, a seed, and/or a plant. To illustrate, foldable form 10*a* can have a length and width 42 and 44 that, when the form is in the first planar state, can each be greater than or substantially equal to any one of, or between any two of: 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, or 300 centimeters (cm) (e.g., between approximately 20.4 cm and approximately 30.4 cm). Length 42 can be greater than or substantially equal to any one of, or between any two of: 0.75, 0.80, 0.85, 0.90, 0.95, 1.00, 1.05, 1.10, 1.15, 1.20, 1.25, 1.30, 1.35, 1.40, 1.45, 1.50, 1.55, 1.60, 1.65, 1.70, 1.75, or 1.80 times width 44. Additionally, as shown foldable form 10*a* is circular when in the first planar state; however, in other embodiments the foldable form can have another shape, such as triangular, square, or otherwise polygonal (whether having sharp and/or rounded corners), elliptical, or otherwise rounded, or can have an irregular shape. Referring to FIG. 3, for example, shown is a second embodiment 10*b* of the present foldable forms that is substantially similar to foldable form 10*a*, the primary exception being that foldable form 10*b* is polygonal.

As shown in FIG. 3, foldable form 10*b* is octagonal such that its edge 16 includes eight vertices 64 and eight sides: four major sides 48 and four minor sides 50. Two of major sides 48 can be aligned in a first direction and another two of the major sides can be aligned in a second direction that is perpendicular to the first direction. As used herein, aligned means within 10 degrees of parallel. Each of minor sides 50 can be shorter (e.g., at least 10% shorter) than each of the major sides 48 and connect a respective pair of perpendicularly-disposed major sides. In each of sub-sectors 20*a* and 20*b* of each sector 18, third cut 26 can terminate at one of edge 16's vertices 64 and/or first cut 22 can terminate at one of the edge's major sides 48 between two of the vertices. This can facilitate folding of flaps 110 and formation of a container.

Figure 4:
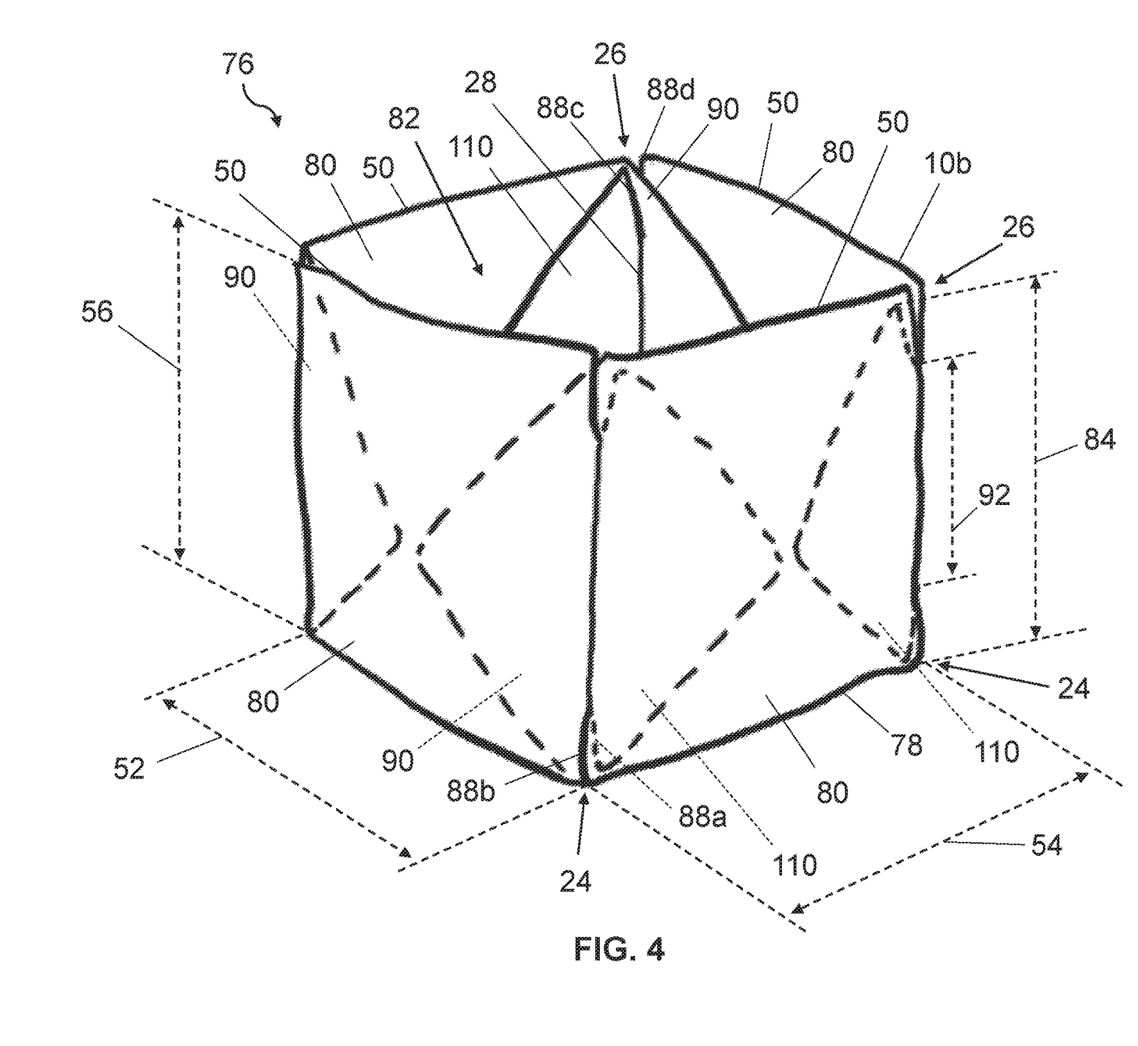
FIG. 4 is a perspective view of one of the present containers made from the foldable form of FIG. 3.

Referring to FIG. 4, shown is foldable form 10*b* folded in the second non-planar state to define a container 76. Foldable form 10*b* can be folded such that container 76 includes a base 78 (e.g., which can include the foldable form's center 32) and one or more side walls 80 extending from the base to define a cavity 82; as shown, the container includes four side walls, each including an upper edge defined by a respective one of the foldable form's minor sides 50. Container 76 can be usable as a planter, and in some embodiments soil, seeds, and/or a plant are disposed in its cavity 82.

Container 76 can have any suitable size (e.g., to hold soil, a seed, and/or a plant in cavity 82). For example, container 76 can have a length and width 52 and 54 (e.g., each substantially equal to the length of one of foldable form 10*b*'s minor sides 50) and a height 56, each of which can be greater than or substantially equal to any one of, or between any two of: 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, or 150 centimeters (cm) (e.g., between approximately 10.2 cm and approximately 15.2 cm). Length, width, and height 52, 54, and 56 can, but need not, be the same; for example, the length can be greater than or substantially equal to any one of, or between any two of: 0.75, 0.80, 0.85, 0.90, 0.95, 1.00, 1.05, 1.10, 1.15, 1.20 1.25, 1.30, 1.35, 1.40, 1.45, 1.50, 1.55, 1.60, 1.65, 1.70, 1.75, or 1.80 times the width.

As described above, the positioning of foldable form 10b's cuts 22-28 can facilitate folding thereof to make container 76. For example, container 76's side wall(s) 80 can include foldable form 10b's fourth cuts 28 and flaps 110 (e.g., a flap for each of the fourth cuts, such as at least four fourth cuts and four flaps), with each of the fourth cuts having a respective one of the flaps inserted therethrough such that the flap is inside cavity 82. Side wall(s) 80 can also include a receiving portion 90 for each of flaps 110 that is inside of cavity 82 and includes one of fourth cuts 28. As shown, two of sidewalls 80 (e.g., which are opposing) each include two flaps 110 and the other two of the sidewalls (e.g., which are also opposing) each include two receiving portions 90. Each of flaps 110 can have a height 84 (e.g., which can be its maximum dimension and which can be substantially equal to container 76's height 56) that is at least 2%, 4%, 6%, 8%, 10%, 12%, 14%, 16%, 18%, or 20% (e.g., at least 10%) larger than the length of the fourth cut 28 that receives it; as explained above, this can impede withdrawal of the flap from the fourth cut by allowing a portion of the flap to engage with receiving portion 90.

Additionally, to facilitate insertion of flaps 110 into fourth cuts 28, the flaps can include at least one of foldable form 10b's second cuts 24 and one of its third cuts 26 (e.g., such that side wall(s) 80 include, in total, at least four second cuts and at least four third cuts). For each flap 110, second cut 24 can be defined by material edges 88a and 88b on either side of the second cut and third cut 26 can be defined by material edges 88c and 88d on either side of the third cut, where for each of the second and third cuts one of the material edges (e.g., 88a and 88c) extends along a portion of the flap's edge and the other of the material edges (e.g., 88b and 88d) extends along an edge of sidewall 80 that the flap is a part of. In this manner, when flaps 110 are inserted through fourth cuts 28, each receiving portion 90 can be received by the second and third cuts 24 and 26 of the flap that is inserted through its fourth cut. Furthermore, a distance 92 between second and third cuts 24 and 26 of each flap 110 can be smaller than the length of fourth cut 28, such as at least 2%, 4%, 6%, 8%, 10%, 12%, 14%, 16%, 18%, or 20% (e.g., at least 10%) smaller than the length of the fourth cut, thereby permitting the portion of the flap disposed therebetween to fit within the fourth cut.

With flaps 110 received by fourth cuts 28, container 76 can be self-supported, e.g., such that foldable form 10b is supported or maintained in the non-planar state without the aid of or reliance on external components. The strength yielded by the insertion of flaps 110 into fourth cuts 28 can be sufficient for container 76 to hold soil, one or more seeds, and/or one or more plants in cavity 82, e.g. such that the container can be planter comprising such components. In other embodiments, however, additional components (e.g., adhesive, tape, and/or the like) can be used to provide additional support for container 76.

Any of the present foldable forms (e.g., 10a and 10b)—and thus containers (e.g., 76)—can be made from a foldable material, which can but need not be a continuous (e.g., single) piece of material. The foldable material can have a basis weight, or grammage, that is substantially equal to any one of, or between any two of: 100, 200, 300, 400, 500, 600, 700, or 800 g/m$^2$ (e.g. approximately 400 g/m$^2$ or approximately 600 g/m$^2$). Such grammages can promote durability and sufficient flexibility for folding while yielding a lightweight container.

The foldable material can comprise any suitable materials, such as, for example, a nonwoven material (e.g., a sheet or web of fibers bonded together mechanically, thermally, or chemically) comprising polyethylene terephthalate fibers, high-density polyethylene fibers, low-density polyethylene fibers, polypropylene fibers, polystyrene fibers, or a combination thereof, and/or a woven material comprising cotton fibers, wool fibers, bamboo fibers, synthetic fibers, or a combination thereof. The foldable material can also include a liquid-impermeable material, such as a film, that can overly a liquid-permeable material (e.g., the nonwoven material) thereof (e.g., such that a liquid, such as water, will not pass through the material, under ordinary use conditions, in a direction generally perpendicular to the plane of the material at the point of liquid contact). The liquid-impermeable material can comprise, for example, polyethylene, polypropylene, polyester, or a combination thereof, and can have a basis weight, or grammage, that is substantially equal to any one of, or between any two of: 50, 75, 100, 125, 150, 175, 200, 225, 250, 275, 300, 325, 350, 375, or 400 g/m$^2$ (e.g. approximately 200 g/m$^2$). The liquid-impermeable material can be disposed inside container 76's cavity 82 such that it can protect an outer material thereof (e.g., the nonwoven material) from liquid in the cavity (e.g., from watering a plant therein). The foldable material, whether or not liquid-impermeable (e.g., with or without an overlying liquid-impermeable material), can be breathable, meaning that the material has a water vapor transmission rate ("WVTR") of at least about 300 grams/m$^2$/24 hours.

Figure 5:
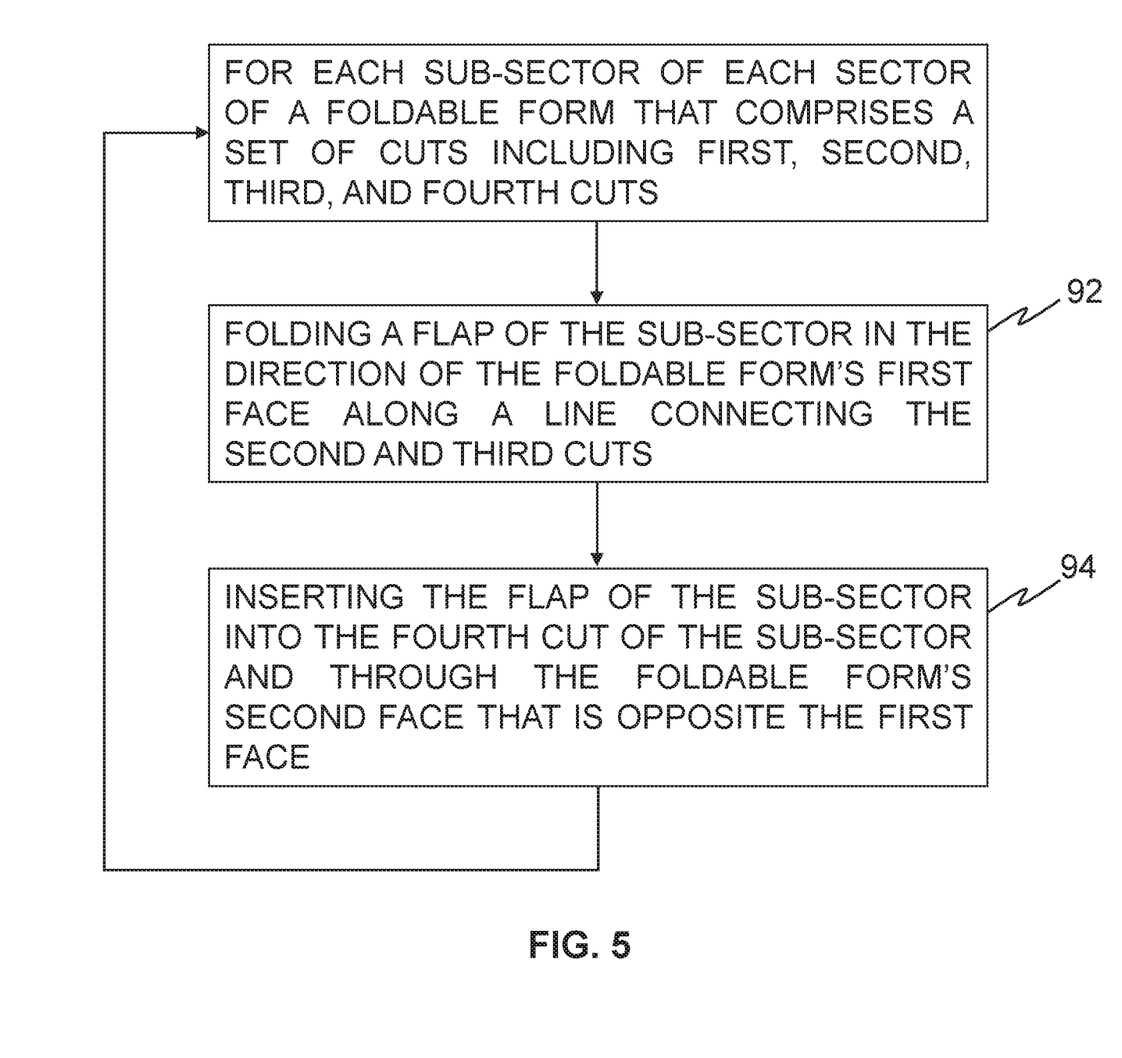
FIG. 5 illustrates some of the present methods of making a container from one of the present foldable forms.
Figure 6:
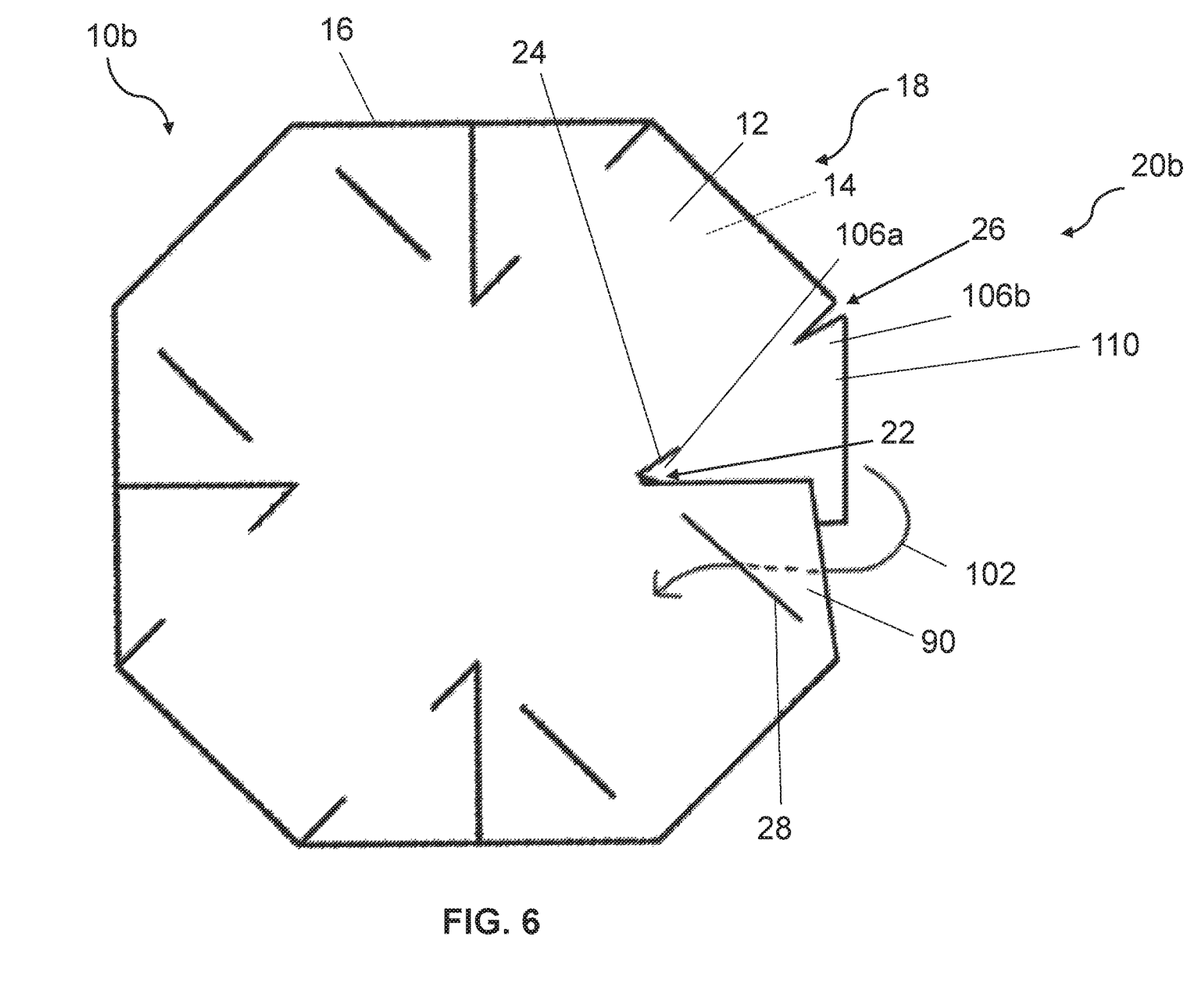
FIG. 6 illustrates folding of a flap of the foldable form of FIG. 3 into one of the fourth cuts thereof.

Referring to FIGS. 5 and 6, shown are steps of some of the present methods of making a container (e.g. 76). The container can be made from any of the present foldable forms (e.g., 10a and 10b), which can have at least two sectors (e.g., 18) that each include first and second sub-sectors (e.g., 20a and 20b), where each of the sub-sectors has a set of cuts (e.g., 22-28) as described above. Some methods comprise, for each sub-sector of each sector of the foldable form, a step 92 of folding a flap (e.g. 110) of the sub-sector (e.g., which is disposed between the first, second, and third cuts, a line (e.g., 34) connecting the second and third cuts, and the foldable form's edge (e.g., 16)). The flap can be folded along the line connecting the second and third cuts of the sub-sector in the direction of the foldable form's first face (e.g., 12). Some methods also comprise a step 94 of inserting the flap of the sub-sector into the sub-sector's fourth cut. As shown in FIG. 6, the flap can be inserted such that it passes through the foldable form's second face (e.g., 14) that is opposite the first face (e.g., as represented by arrow 102), thereby allowing the flap to be inside of a cavity (e.g., 82) defined by the container when the container is formed. A receiving portion (e.g., 90) of the sub-sector that includes the fourth cut can also be folded in the direction of the foldable form's first face (e.g., along a line that is substantially parallel with the fourth cut, if the fourth cut is linear) to facilitate insertion and retention of the flap through the fourth cut. In some methods, a portion (e.g., 106a) of the flap bound by the first and second cuts and a portion (e.g., 106b) of the flap bound by the third cut and a section of the foldable form's edge can each be folded in the direction of the first face, which can facilitate insertion of the flap into the fourth cut (e.g., such that the maximum dimension of the flap is smaller than the fourth cut's length such that the flap can be received therethrough, even if the maximum dimension is larger than the fourth cut's length when these portions thereof are not folded). Once the flap is inserted into the fourth cut, these portions of the flap can be unfolded such that they promote retention thereof in the fourth cut. These steps can be repeated for each sub-sector of each sector to form the container, which can be usable as, for example, a planter.

Some embodiments can comprise a kit that includes one or more of the present foldable forms (e.g., 10a and 10b) along with one or more additional components, such as soil, seeds, and/or fertilizers. A kit can also include one or more containers into which the foldable form(s) can be retained (e.g., when they are in a non-planar state), such as injection- or blow-molded plastic container(s). Instructions for assembling components of the kit (e.g., how to fold and maintain the foldable form(s) in their non-planar state and how to use the foldable form(s)) can also be included.

Some of the present methods of using a container (e.g., 76) (e.g., any of those described above) comprising placing soil, one or more seeds, and/or one or more plants in the cavity (e.g., 82) of the container.

The above specification and examples provide a complete description of the structure and use of illustrative embodiments. Although certain embodiments have been described above with a certain degree of particularity, or with reference to one or more individual embodiments, those of ordinary skilled in the art could make numerous alterations to the disclosed embodiments without departing from the scope of this invention. As such, the various illustrative embodiments of the apparatuses and methods are not intended to be limited to the particular forms disclosed. Rather, they include all modifications and alternatives falling within the scope of the claims, and embodiments other than the ones shown may include some or all of the features of the depicted embodiments. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A foldable form capable of being folded between a first planar state and a second non-planar state, wherein the foldable form comprises, when in the first planar state:
    a first face;
    a second face that is opposite the first face; and
    an edge;
    wherein the form includes at least two sectors, each sector comprising a first sub-sector and a second sub-sector, wherein:
        each sub-sector defines a set of cuts comprising:
            a first cut extending from the edge and toward a center of the form and terminating at a second cut that extends from the first cut and away from the center;
            a third cut extending from a portion of the edge that is disposed between the first cut of the first sub-sector and the first cut of the second sub-sector; and
            a fourth cut, wherein the first and second cuts are disposed between the third cut and the fourth cut in a direction along the edge, wherein the fourth cut does not extend to the edge and does not contact the first, second, or third cuts;
        wherein:
            a portion of the form between the first cut, second cut, third cut, and the edge forms a flap of the sub-sector that is foldable relative to the rest of the form; and
            the length between the termination of the first cut at the second cut and the beginning of the third cut at the edge is at least 10% larger than the length of the fourth cut; and
        the set of cuts of the second sub-sector mirrors the set of cuts of the first sub-sector with a line of symmetry running from the center to the edge and oriented between the third cut of the first sub-sector and the third cut of the second sub-sector.

2. The foldable form of claim 1, wherein the second and third cuts of each set are collinear but do not intersect.

3. The foldable form of claim 1, wherein a smallest angle defined between the first and second cuts of each set is between 30 and 90°.

4. The foldable form of claim 1, wherein a smallest angle defined between the second and fourth cuts of each set is between 30 and 150°.

5. The foldable form of claim 1, wherein the form is a continuous piece of foldable material.

6. The foldable form of claim 1, wherein the form is made of a material comprising a nonwoven material.

7. The foldable form of claim 6, wherein the nonwoven material has a grammage that is between 300 and 600 grams per square meter.

8. The foldable form of claim 6, wherein the nonwoven material comprises polyethylene terephthalate, high-density polyethylene, low-density polyethylene, polypropylene, polystyrene, or a combination thereof.

9. The foldable form of claim 6, wherein the foldable material further comprises a liquid-impermeable material overlying the nonwoven material.

10. The foldable form of claim 9, wherein the liquid-impermeable material has a grammage that is between 100 and 300 grams per square meter.

11. The foldable form of claim 9 wherein the liquid-impermeable material comprises polyethylene, polypropylene, polyester, or a combination thereof.

12. The foldable form of claim 1, wherein the fourth cut of each set is collinear with the location at which the first cut terminates at the second cut.

13. A container comprising:
    a base; and
    at least one side wall extending from the base to define a cavity;
    wherein the at least one side wall includes at least two sidewall portions coupled together via:
        one or more fourth cuts in the sidewall; and
        for each of the fourth cuts, flaps having at least a first cut, a second cut and a third cut, wherein:
            each of the first cuts terminates at a second cut;
            for each of the second and third cuts, the cut is defined by two material edges on either side of the cut, wherein one of the material edges extends along a portion of the edge of the flap and the other of the material edges extends along an edge of the sidewall;

a portion of the side wall is received within each of the second and third cuts;

the distance between the second and third cuts is at least 10% smaller than the length of the fourth cut;

the height of the flap is at least 10% larger than the length of the fourth cut; and the flap is received by the fourth cut such that the flap is inside the cavity.

14. The container of claim 13, wherein soil, a seed, and/or a plant are disposed in the cavity.

15. The container of claim 13, wherein the container is self-supported.

16. The container of claim 13, wherein the foldable form is a continuous piece of foldable material.

17. The container of claim 13, wherein the foldable form comprises a nonwoven material.

18. A method of using the container of claim 13 as a planter, the method comprising placing soil, one or more seeds, and/or one or more plants in the cavity of the container.

19. A method of making a container from the foldable form of claim 1 by folding the form from the first planar state into the second non-planar state, wherein the container is usable as a planter, the method comprising, for each sub-sector:

folding the flap of the sub-sector in the direction of the first face between the second and third cuts; and inserting the flap into the fourth cut through the second face of the foldable form.

20. The method of claim 19, further comprising, for each of the flaps, folding in the direction of the first face a portion of the flap bound by the first and second cuts and a portion of the flap bound by the third cut and a portion of the edge of the form to facilitate insertion of the flap into the fourth cut.

* * * * *